UNITED STATES PATENT OFFICE.

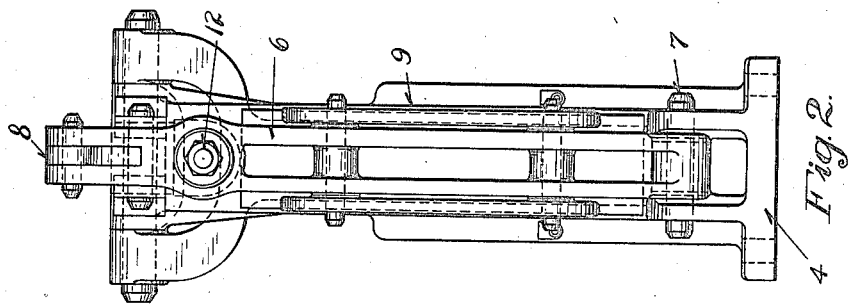
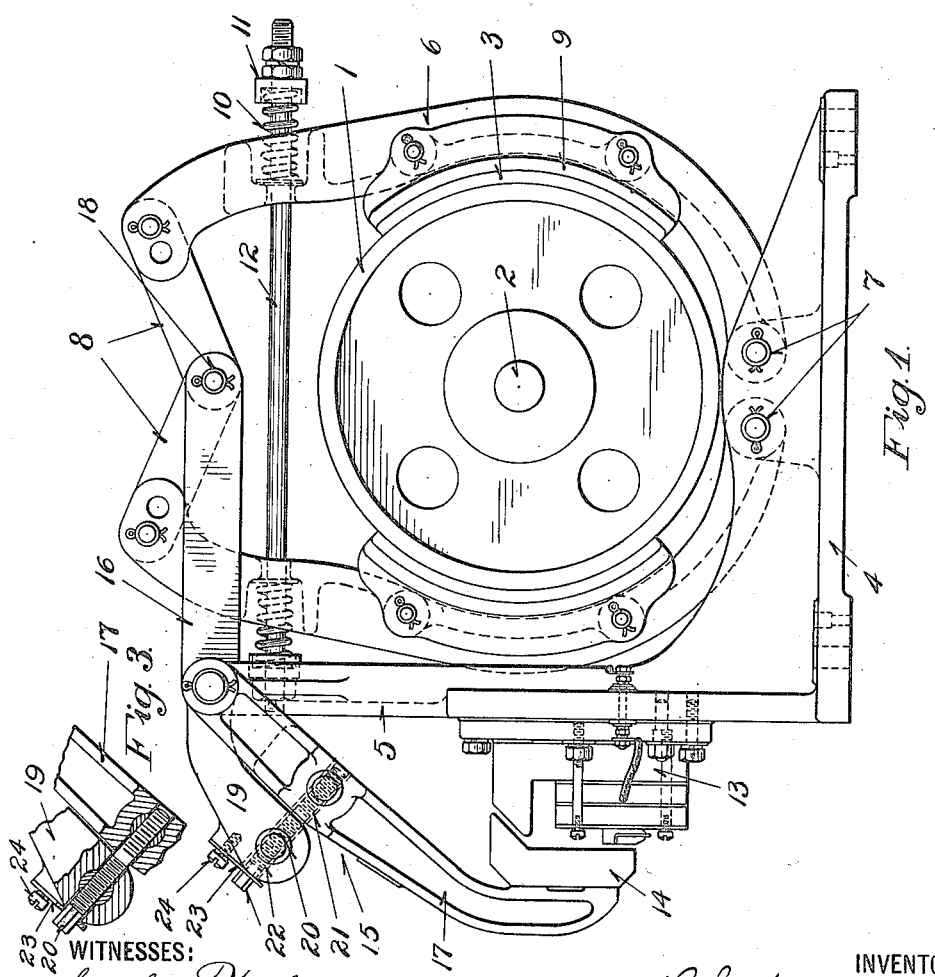

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

BRAKE.

1,231,633.

Specification of Letters Patent.

Patented July 3, 1917.

Application filed March 30, 1914. Serial No. 828,202.

*To all whom it may concern:*

Be it known that I, CHESTER B. MILLS, a citizen of the United States, and a resident of East McKeesport, in the county of Allegheny and State of Pennsylvania, have invented a new and useful Improvement in Brakes, of which the following is a specification.

My invention relates to brakes for hoisting apparatus and similar mechanisms, and it has particular reference to brakes that are controlled by electromagnetic devices.

My invention has for its object to provide a simple and convenient means for adjusting a brake to compensate for wear incident to its operation, and thus maintain proper conditions for efficient operation.

In the operation of electromagnetically controlled brakes, it is necessary, at intervals, to adjust the means for connecting the movable member of the actuating magnet to the brake shoes in order to maintain the proper relation between the parts of the magnet. The normal position of the movable member of the magnet varies as the brake shoes become thinner because of wear, and, consequently, the initial pull of the magnet is decreased as the distance of the air gap between its relatively movable parts is increased.

I provide a brake having an actuating lever that is composed of two relatively movable arms. The angle formed by the two arms is controlled by an adjustable threaded screw or bolt, thus providing, in effect, an arrangement similar to that of a micrometer. By means of such an arrangement, adjustments of any desired amount may be made with convenience and precision and efficient operating conditions may thereby be maintained.

The details of my invention are described in connection with the accompanying drawings in which Figure 1 is an end view, in elevation, of a brake mechanism constructed in accordance with my invention and a wheel to which it is applied. Fig. 2 is a side view, in elevation of the mechanism of Fig. 1. Fig. 3 is a fragmentary view of a modification of my invention.

A brake wheel 1 is mounted on a shaft 2 of an electric motor (not shown) and is provided with a suitable periphery 3 that is adapted for frictional engagement with coöperating shoes. The brake comprises a brake member 4 that is adapted to be mounted upon any suitable support, and comprises an upright portion 5. Two curved levers 6 are pivotally supported upon pins 7 that are located near the central portion of the base member 4. The arms 6 extend upwardly at the sides of the wheel 1, and are connected, at their upper ends, by links 8. Each of the levers 6 is provided with a brake shoe 9, the brake shoes being located at diametrically opposite sides of the wheel 1. The levers 6 are normally pressed toward each other by helical springs 10 the outer ends of which bear against flanged washers 11 that are mounted upon a rod 12 and are restrained from axial movement thereon. An electromagnet 13, that is mounted upon the upright portion 5, has a movable armature 14. A lever 15, comprises two arms 16 and 17 that connect the armature 14 to a pin 18 which forms a pivotal connection for the links 8. The arm 16 is provided with a projecting portion 19 which is connected to an intermediate portion of the arm 17 by means of a screw 20. The screw 20 is provided with oppositely threaded portions 21 and 22 that coact, respectively, with correspondingly threaded holes in the arm 17 and in the projecting portion 19. The angle formed by the arms 17 and 18 may be varied by properly adjusting the screw 20. Rotation of the screw 20 is prevented by a locking plate 23 and a locking screw 24.

It may be assumed that the various parts occupy their respective positions, as illustrated. The shoes 9 are pressed against the periphery 3 of the wheel 1 by the force of the springs 10 which act against the levers 6. In this position of the brake, no current is supplied to the windings of the electromagnet 13 and the armature member 14 is separated from the stationary portion of the magnet by an air gap that is sufficiently large to provide a considerable range of movement for the armature member 14. When current is supplied to the windings of the magnet 13, the armature member 14 is drawn toward the stationary portion of the magnet and the lever 15 is actuated to separate the levers 6 by means of the toggle joint formed by the links 8, whereupon the wheel 1 will be allowed to rotate freely. Upon the breaking of the circuit which supplies energy to the windings of the electromagnet 13, the armature 14 will be released, and the springs 10 will again apply the brake shoes 9 to the periphery of the wheel 1. As the brake shoes become worn, the levers 6 are separated by a smaller distance when the shoes are in their respective operative positions, and the upper end of the lever 15 occupies a lower position than that normally occupied by it. The result is to increase the air gap between the armature 14 and the stationary portion of the electromagnet 13. Since the reluctance of the magnetic circuit is thus increased, the pull of the magnet is decreased in the same proportion, and the efficiency of the brake is thereby impaired.

It is necessary, therefore, at intervals, to adjust the mechanism in order to maintain the proper distance between the armature 14 and the coacting parts of the magnet 13. This may be readily accomplished by means of the screw 20, it being necessary merely to turn it in the proper direction to separate the projecting portion 19 and the intermediate portion of the arm 17.

Referring to Fig. 3, a modification of the adjusting device comprises a screw 25 which is similar to the screw 20 in Fig. 1, except that the similarly threaded portions 26 and 27 are provided with threads of different pitch. The mechanism of Fig. 3 differs in no other material respect from the mechanism of Fig. 1.

It will be noted that I have provided a simple and effective means for adjusting the relative positions of the coacting parts of the actuating magnet.

I claim as my invention:

1. In a brake, the combination with a brake shoe, and an electromagnet comprising a movable portion, of means for operatively connecting said movable portion to said shoe, said means comprising a lever having two relatively movable parts, and adjustable means for connecting said parts.

2. In a brake, the combination with a brake shoe, and an electromagnetic actuating device therefor, of means for connecting said device to said shoe, said means comprising an armature member, a pair of pivotally mounted arms and adjustable means for connecting said arms to vary the normal position of said armature member.

3. In a brake, the combination with a brake shoe, and an electromagnetic device for actuating said shoe, of means for operatively connecting said device to said shoe, said means comprising an armature member, a pair of relatively movable members, and adjustable means for connecting said members to regulate the initial air gap between said armature member and said device.

4. In a brake, the combination with a brake shoe, and an electromagnet comprising a movable member, of means for connecting said movable member to said shoe, said means comprising a pair of oppositely extending arms having a pivotal support at adjacent ends, and adjustable means for locking said arms against relative movement.

5. In a brake, the combination with a brake shoe, and an electromagnet comprising a movable member, of means for operatively connecting said member to said shoe, said means comprising a lever having two pivotally mounted arms, and means for locking said arms against relative movement.

6. In a brake, the combination with a wheel, a brake shoe, and means for actuating said shoe to engage said wheel, of means comprising an electromagnet having a movable member for releasing said shoe from engagement with said wheel, and means for adjusting the normal position of said movable member.

7. In a brake, the combination with a brake shoe, and a device for actuating said shoe, of means for operatively connecting said device to said shoe, said means comprising a pair of relatively movable members having a common pivotal support, and adjustable means for rigidly connecting said members.

8. In a brake, the combination with a brake shoe, and a device for actuating said shoe, of means for operatively connecting said device to said shoe, said means comprising a pair of relatively movable members having a common pivotal support, and a single adjustable member for connecting said members.

9. In a brake, the combination with a brake shoe and an electromagnet for actuating said shoe, of means for operatively connecting said electromagnet to said shoe, said means comprising a pair of relatively movable members and an adjustable member having portions respectively provided with screw-threads bearing different relations to the axis of the adjustable member.

10. In a brake, the combination with a wheel, a brake shoe, and means for actuating said shoe to engage said wheel, of means comprising an electromagnet having a movable member for releasing said shoe from engagement with said wheel, and means for adjusting the normal position of said movable member, said adjusting means comprising a member having portions respectively provided with right-hand and with left-hand screw threads.

11. In a brake, the combination with a brake shoe and an actuating device therefor, of means for operatively connecting said device to said shoe, said means comprising a pair of relatively movable members, and an adjustable member having portions provided with oppositely-extending screw threads.

In testimony whereof, I have hereunto subscribed my name this 25th day of Mar. 1914.

CHESTER B. MILLS.

Witnesses:
O. C. SCHOENFELD,
B. B. HINES.